(No Model.) 2 Sheets—Sheet 1.

C. E. SCRIBNER.
ELECTRIC RESISTANCE MEASURING APPARATUS.

No. 388,454. Patented Aug. 28, 1888.

Witnesses:
Chas. G. Hawley.
L. M. Page.

Inventor:
Charles E. Scribner.
By George P. Barton,
Attorney.

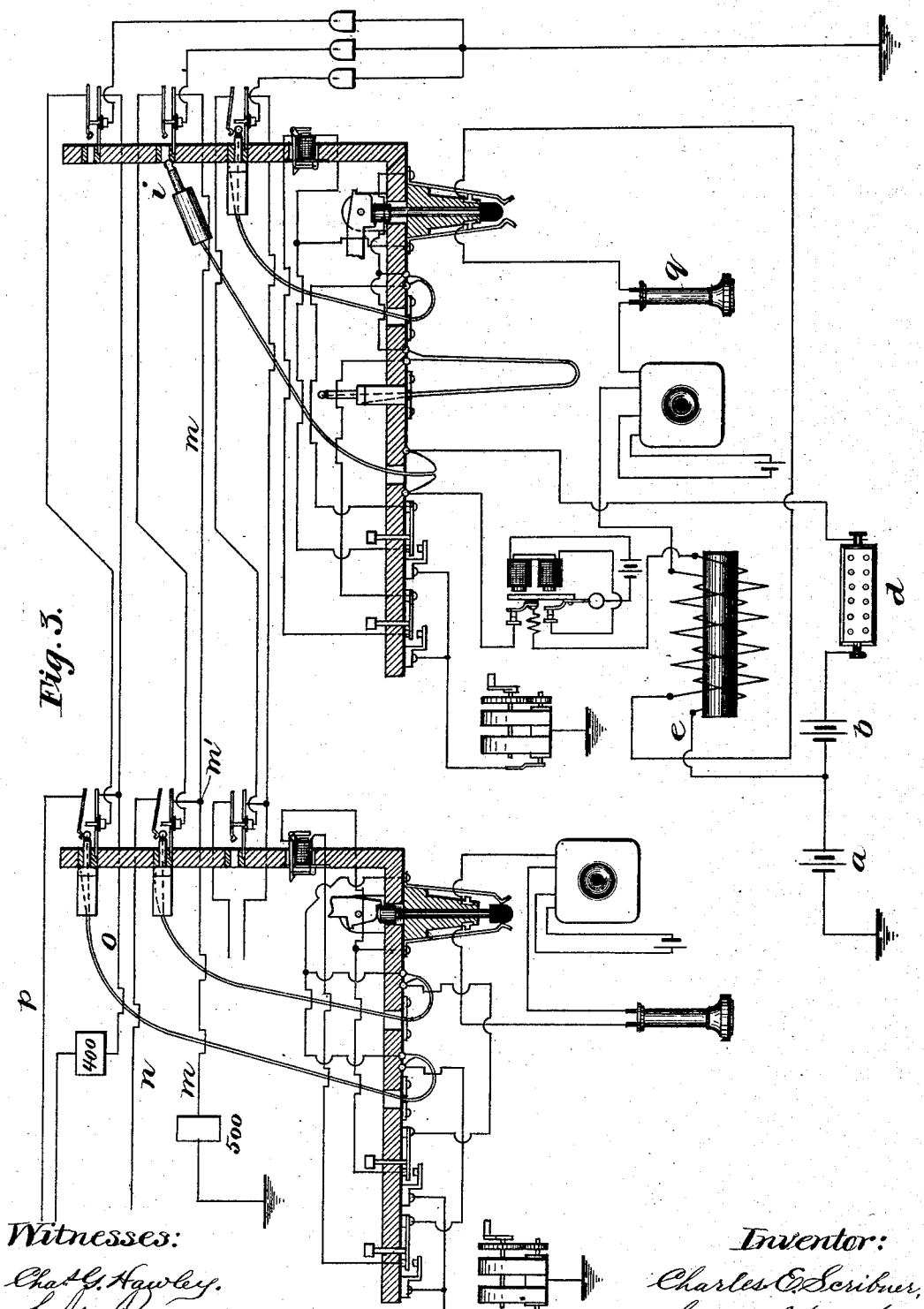

UNITED STATES PATENT OFFICE.

CHARLES E. SCRIBNER, OF CHICAGO, ILLINOIS, ASSIGNOR TO THE WESTERN ELECTRIC COMPANY, OF SAME PLACE.

ELECTRIC RESISTANCE-MEASURING APPARATUS.

SPECIFICATION forming part of Letters Patent No. 388,454, dated August 28, 1888.

Application filed June 1, 1888. Serial No. 275,751. (No model.)

*To all whom it may concern:*

Be it known that I, CHARLES E. SCRIBNER, a citizen of the United States, residing at Chicago, in the county of Cook and State of Illinois, have invented a certain new and useful Improvement in Electric Resistance-Measuring Apparatus, (Case 155,) of which the following is a full, clear, concise, and exact description, reference being had to the accompanying drawings, forming a part of this specification.

My invention relates to testing apparatus for measuring the resistance of an electric circuit.

My invention is especially applicable to multiple switch-board telephone-exchange systems as a means of testing to determine whether a line wanted at one board is connected or in use at another board.

Figure 1:
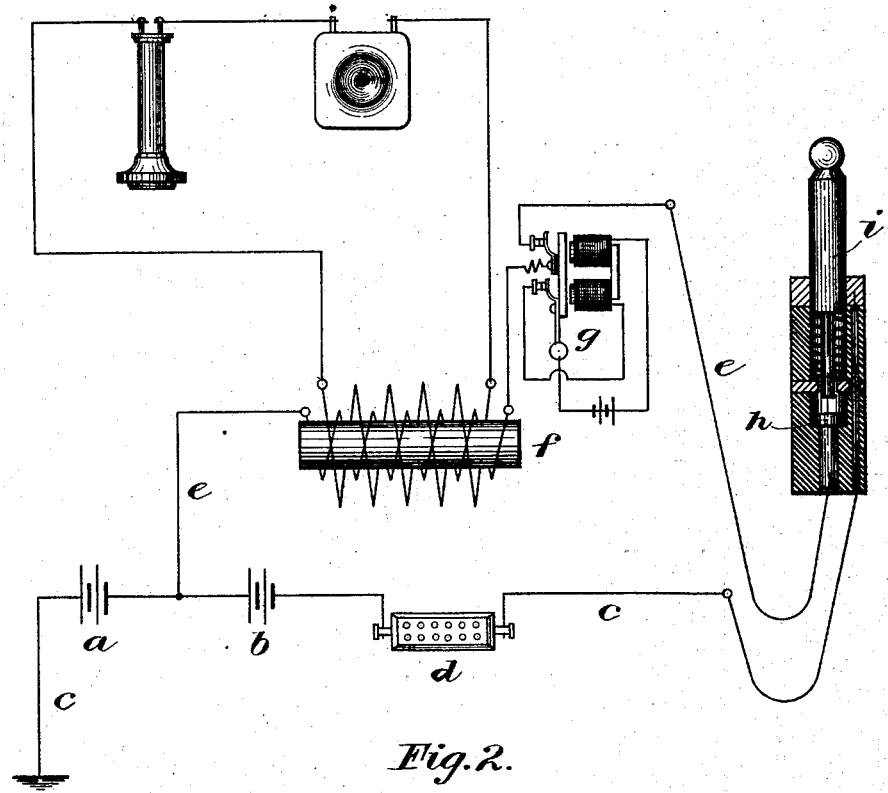
Figure 2:
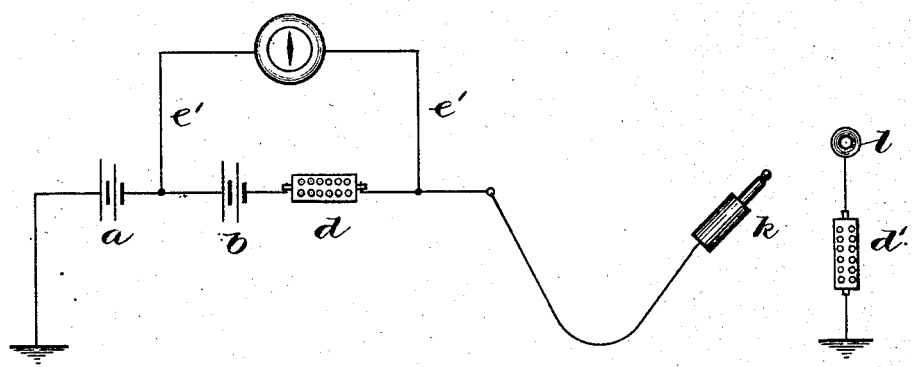

In the accompanying drawings, which are illustrative of my invention, Figure 1 is a diagrammatic view of the preferable form of my apparatus for measuring resistance. Fig. 2 is a view thereof shown in a more simple or general form. Fig. 3 is a diagrammatic view showing my invention as applied to multiple switch-board system of telephone-exchange.

In Fig. 1 I have shown two batteries, $a$ and $b$, connected in the circuit $c$ with the rheostat $d$. These batteries $a$ and $b$ should be of the same electro-motive force, and are connected in the circuit $c$ with poles in the same direction. Between these batteries I connect the branch circuit $e$, and preferably include in said branch $e$ the primary coil of an induction-coil, $f$, and a rheotome, $g$. In the secondary coil of this induction-coil I include a telephone. At the ends of circuits $c\ e$, I provide a circuit closing or switch device, by means of which said circuits $c\ e$ may be connected together and at the same time connected with the circuit to be tested. I have shown this switch or connecting device in the form of a test-plug, branch wire $e$ being connected with a contact, $h$, of the test-plug, and circuit $c$ being connected with the stem or tip $i$ thereof. By pressing the tip against the contact-piece of any circuit to be tested the tip $i$ will be forced down to close contact with contact-point $h$. Thus at the time the tip $i$ is closed to the circuit to be tested the terminals of wires $c\ e$ will be connected together. When connection is thus formed, if the resistance from the tip of the plug to ground through the circuit to be tested is equal to the resistance of the rheostat $d$, the zinc current from battery $a$, sent in derived circuit through wire $e$, will be equal to the copper current sent in the same direction or derived from battery $b$ and passing over the same circuit $e$. The zinc and copper currents thus uniting in circuit $e$ will be neutralized, and the induction-coil will remain neutral, and consequently no current will be induced in the secondary coil and no sound will be heard in the telephone in circuit with said coil. If, however, the resistance of the circuit to be tested is either substantially less or substantially more than the resistance of rheostat $d$ an efficient current will be found in passing through the primary coil, and hence current will be induced in the secondary coil, causing a sound in the telephone.

In the modification shown in Fig. 2 I have shown a galvanometer in the shunt-wire $e'$ around battery $b$ and rheostat $d$. The batteries $a$ and $b$ being of equal electro-motive force, and the derived currents from said batteries passing over shunt-wire $e$ being of opposite polarities, will neutralize one another and the galvanometer will remain at zero. If, however, either the current derived from either one of the batteries in shunt-wire $e'$ is greater than the current of the opposite polarity derived from the other battery, the needle of the galvanometer will be deflected to indicate the current passing. Now, we will suppose that the metallic tip of the plug $k$ be applied to the test-piece $l$ of the circuit to be tested, and suppose such circuit contains a resistance, $d'$, equal to the resistance $d$. Under these conditions we shall find that no current will be indicated by the galvanometer included in the shunt-wire $e'$. In Fig. 3 I have shown the apparatus described in Fig. 1 as a portion of the testing apparatus at a multiple switch-board of a multiple switch-board system of telephone-exchange.

In my case No. 156, Serial No. 275,752, filed June 1, 1888, for test-circuits for multiple switch boards, I have described and claimed a balanceresistance test system in which the resistances of the test-circuits of the different lines are balanced the same as shown in Fig. 3—that is to say, the resistance in the test-circuit $m$ of line $n$ is the same as the resistance of the limb $o$ of the metallic circuit composed of said limb $o$ and limb $p$. I have shown the switch-boards and lines connected therewith in Fig. 3 as illustrating one of the applications of my invention. We will suppose the resistance of rheostat $d$ to be five hundred ohms, and the resistance of test-circuit $m$ to be five hundred ohms, and suppose said test-circuit $m$ to be open. Now, on connecting the tip $i$ of the test-plug, as shown, with a test-piece with which said circuit $m$ is connected and listening at the telephone $q$, no sound will be heard, since the currents derived from batteries $a$ $b$ passing through the circuit or shunt $e$, which includes the primary coil of the induction-coil, will be neutralized. If, however, connection is made with line $n$, as shown at the first board in Fig. 1, test-wire $m$ will be connected, as shown, with the sleeve of the connecting-plug inserted in the switch of said line $n$, and thus from point $m'$ there will be two derived circuits, one passing through the five hundred ohms resistance to ground, and the other through a strand of the cord to the sleeve of the other plug of the pair over limb $o$ to the subscriber's station, and back over limb $p$ to the tip of the plug, thence through the other strand of the cord to the tip of the plug inserted in the switch of line $n$, and thence over line $n$ to ground at the subscriber's station of line $n$. The resistance of the derived circuits will therefore be substantially less than the resistance of the rheostat $d$; and hence, when connection is made with the tip $i$ of the test-plug, as shown, a sound will be heard in the telephone if the line $n$ is connected, as shown, with some other line.

I need not describe further the different combinations of metallic circuits and single-line circuits. I will simply say, however, that the lines are so balanced and arranged that when a line in use is tested a sound will be heard in the telephone $q$, and when the line is not in use no sound will be heard therein.

Having thus described my invention, I claim as new and desire to secure by Letters Patent—

1. A resistance-measuring apparatus consisting, essentially, in a circuit including two batteries of substantially equal electro-motive force and a rheostat, a shunt-wire, including a current-indicating apparatus connected between said batteries at one end and at a point of the circuit beyond the rheostat at the other end, and a connecting device for closing said circuit with the circuit to be tested, substantially as described.

2. A resistance-measuring apparatus consisting, essentially, in the circuit $e$, including batteries $a$ $b$ and rheostat $d$, the shunt-circuit $e$, branched from point between said batteries $a$ $b$, said branch or shunt $e$ including the primary of an induction coil, and a rheotome, a telephone included in the secondary coil of said induction-coil, and a switching device for connecting the terminals of circuits $c$ $e$ together while connection is made with the circuit to be tested, substantially as described.

In witness whereof I hereunto subscribe my name this 26th day of January, A. D. 1888.

CHARLES E. SCRIBNER.

Witnesses:
GEORGE P. BARTON,
CHAS. C. WOODWORTH.